United States Patent
Angell et al.

(10) Patent No.: US 9,495,349 B2
(45) Date of Patent: Nov. 15, 2016

(54) SYSTEM AND METHOD FOR USING TEXT ANALYTICS TO IDENTIFY A SET OF RELATED DOCUMENTS FROM A SOURCE DOCUMENT

(75) Inventors: Robert L. Angell, Salt Lake City, UT (US); Stephen K. Boyer, San Jose, CA (US); James W. Cooper, Wilton, CT (US); Richard A. Hennessy, Austin, TX (US); Tapas Kanungo, San Jose, CA (US); Jeffrey T. Kreulen, San Jose, CA (US); David C. Martin, San Jose, CA (US); James J. Rhodes, San Jose, CA (US); W. Scott Spangler, San Martin, CA (US); Herschel J. R. Weintraub, Peoria, AZ (US)

(73) Assignee: International Business Machines Corporation, Armonk, NY (US)

( * ) Notice: Subject to any disclaimer, the term of this patent is extended or adjusted under 35 U.S.C. 154(b) by 1566 days.

(21) Appl. No.: 11/281,291

(22) Filed: Nov. 17, 2005

(65) Prior Publication Data
US 2007/0112748 A1    May 17, 2007

(51) Int. Cl.
*G06F 7/00* (2006.01)
*G06F 17/27* (2006.01)

(52) U.S. Cl.
CPC .................................... *G06F 17/27* (2013.01)

(58) Field of Classification Search
CPC .................... G06F 17/30864; G06F 17/3071; G06F 17/241; G06F 17/30702
USPC .................................... 707/3, 708, 736, 758
See application file for complete search history.

(56) References Cited

U.S. PATENT DOCUMENTS

| | | | |
|---|---|---|---|
| 4,642,762 A | | 2/1987 | Fisanick |
| 5,794,236 A | | 8/1998 | Mehrle |
| 5,950,192 A | | 9/1999 | Moore et al. |
| 6,038,560 A | * | 3/2000 | Wical |
| 6,038,574 A | | 3/2000 | Pitkow et al. |
| 6,098,034 A | | 8/2000 | Razin et al. |
| 6,286,018 B1 | | 9/2001 | Pitkow et al. |
| 6,289,342 B1 | | 9/2001 | Lawrence et al. |
| 6,304,869 B1 | | 10/2001 | Moore et al. |
| 6,389,436 B1 | | 5/2002 | Chakrabarti et al. |
| 6,604,114 B1 | | 8/2003 | Toong et al. |
| 6,732,090 B2 | | 5/2004 | Shanahan et al. |
| 6,823,301 B1 | | 11/2004 | Ishikura |
| 6,879,990 B1 | | 4/2005 | Boyer et al. |
| 6,963,830 B1 | | 11/2005 | Nakao |
| 7,003,517 B1 | * | 2/2006 | Seibel et al. |

(Continued)

OTHER PUBLICATIONS

Yang et al., "A Study of Approaches to Hypertext Categorization," Mar. 2002, pp. 219-241, Journal of Intelligent Information Systems, vol. 18:2/3.

(Continued)

*Primary Examiner* — Hung T Vy
(74) *Attorney, Agent, or Firm* — Daniel Simek; Hoffman Warnick LLC

(57) ABSTRACT

A system and method for processing a document to generate a set of related documents. A system is provided that includes a textual analytics system that analyzes unstructured data contained in a source document and extracts a set of structured information about the source document; and a compare system that identifies a set of related documents by comparing the set of structured information with metadata indexed from a set of publications.

10 Claims, 2 Drawing Sheets

(56) References Cited

U.S. PATENT DOCUMENTS

| | | | |
|---|---|---|---|
| 7,054,754 | B1 | 5/2006 | Brecher |
| 7,065,514 | B2 | 6/2006 | Yang-Stephens et al. |
| 7,197,697 | B1 | 3/2007 | Tsukamoto |
| 2002/0062302 | A1 | 5/2002 | Oosta |
| 2002/0169755 | A1 | 11/2002 | Framroze et al. |
| 2002/0169762 | A1 | 11/2002 | Cardona |
| 2003/0033295 | A1 | 2/2003 | Adler et al. |
| 2004/0088332 | A1 | 5/2004 | Lee et al. |
| 2004/0093331 | A1 | 5/2004 | Garner et al. |
| 2004/0093561 | A1 | 5/2004 | Yeh et al. |
| 2004/0117405 | A1* | 6/2004 | Short et al. ............... 707/104.1 |
| 2004/0133433 | A1 | 7/2004 | Lee et al. |
| 2004/0172378 | A1* | 9/2004 | Shanahan et al. ............... 707/1 |
| 2004/0177068 | A1 | 9/2004 | Beretich, Jr. et al. |
| 2004/0181427 | A1 | 9/2004 | Stobbs et al. |
| 2004/0186833 | A1 | 9/2004 | Watts |
| 2004/0205448 | A1* | 10/2004 | Grefenstette et al. ......... 715/500 |
| 2005/0060305 | A1* | 3/2005 | Hopkins et al. .................. 707/3 |
| 2005/0071367 | A1 | 3/2005 | He et al. |
| 2005/0108001 | A1 | 5/2005 | Aarskog |
| 2005/0131025 | A1 | 6/2005 | Matier et al. |
| 2005/0160107 | A1* | 7/2005 | Liang ............................. 707/100 |
| 2005/0234952 | A1* | 10/2005 | Zeng et al. ................... 707/101 |
| 2005/0246316 | A1* | 11/2005 | Lawson et al. .................... 707/2 |
| 2006/0095298 | A1* | 5/2006 | Bina ................................ 705/2 |
| 2007/0112833 | A1 | 5/2007 | Angell et al. |
| 2007/0208719 | A1 | 9/2007 | Tran |

OTHER PUBLICATIONS

Chakrabarti et al., "Enhanced Hypertext Categorization Using Hyperlinks," 1998, pp. 307-318, Proceedings of the 1998 ACM SIGMOD International Conference on Management of Data.

Fall et al., "Automated Categorization in the International Patent Classification," Spring 2003, pp. 10-25, ACM SIGIR Forum, vol. 37, No. 1.

Si et al., "On the Use of Hierachy Information in Mapping Patents to Biomedical Ontologies," IBM Research Report, Oct. 2005, pp. 1-21, RJ10365 (A0541-017).

Li et al., "Automatic Patent Classification Using Citation Network Information: An Experimental Study in Nanotechnology," Jun. 2007, pp. 419-427, Proceedings of the 7th ACM/IEEE-CS Joint Conference on Digital Libraries.

Wassum, Office Communication for U.S. Appl. No. 11/281,290 dated Mar. 4, 2009, 7 pages.

Wassum, Office Communication for U.S. Appl. No. 11/281,290 dated Jul. 10, 2009, 3 pages.

Wassum, Office Communication for U.S. Appl. No. 11/281,290 dated Nov. 17, 2009, 18 pages.

Wassum, Office Communication for U.S. Appl. No. 11/281,290 dated Jun. 29, 2010, 20 pages.

Wassum, Examiner's Answer for U.S. Appl. No. 11/281,290 dated Jan. 19, 2011, 28 pages.

Volk, Martin et al., "A Systematic Evaluation of Concept-based Cross-Lingual Information Retrieval in the Medical Domain," pp. 1-6, Proceeding of 3rd Dutch-Belgian Information, Oct. 31, 2002.

"Smiles Parser", http://www.wag.caltech.edu/home/meulbroek/smiles/smiles_parser.htm, Feb. 24, 2004, 1pg.

Eugene Garfield, "An Algorithm for Translating Chemical Names to Molecular Formulas", Essays of an Information Scientist, vol. 7, pp. 441-513, 1984.

Wilber et al., "Analysis of Biomedical Text for Chemical Names: A Comparison of Three Methods", pp. 176-180, 1999.

Narayanaswamy et al., "A Biological Named Entity Recognizer", Pacific Symposium on Biocomputing 8: pp. 427-438, 2003.

Dittmar et al., "The CAS Online Search System. 1. General System Design and Selection, Generation, and Use of Search Screens", J. Chem. Inf. Comput. Sci. 1983, 23, 93-102.

Nick Kemp and Michael Lynch; "Extraction of Information from the Text of Chemical Patents. 1. Identification of Specific Chemical Names", J. Chem. Inf. Comput. Sci. 1998, vol. 38, pp. 544-551. Jan. 6, 1998.

Leiter et al.; "Installation and Operation of a Registry for Chemical Compounds" Journal of Chemical Documentation, Jul. 7, 1965, pp. 238-242.

Shivaratri et al.; "Load Distibuting for Locally Distributed Systems", IEEE, Dec. 1992, pp. 33-44.

Drefahl et al.; "Similarity-Based Search and Evaluation of Environmentally Relevant Properties for Organic Compounds in Combination with the Group Contribution Approach", J. Chem. Inf. Comput. Sci. vol. 33 pp. 886-895, Feb. 17, 1993.

Jackson: U.S. Appl. No. 10/670,675, Office Action Mar. 3, 2009, 17 pgs.

Jackson: U.S. Appl. No. 10/670,675, Office Action Sep. 11, 2009, 7 pgs.

Jackson: U.S. Appl. No. 10/670,675, Office Action Aug. 6, 2008, 16 pgs.

Jackson: U.S. Appl. No. 10/670,675, Notice of Allowance Oct. 20, 2009, 6 pgs.

Shimatov, Office Action Communication for U.S. Appl. No. 11/281,290 dated Jul. 28, 2014, 53 pages.

* cited by examiner

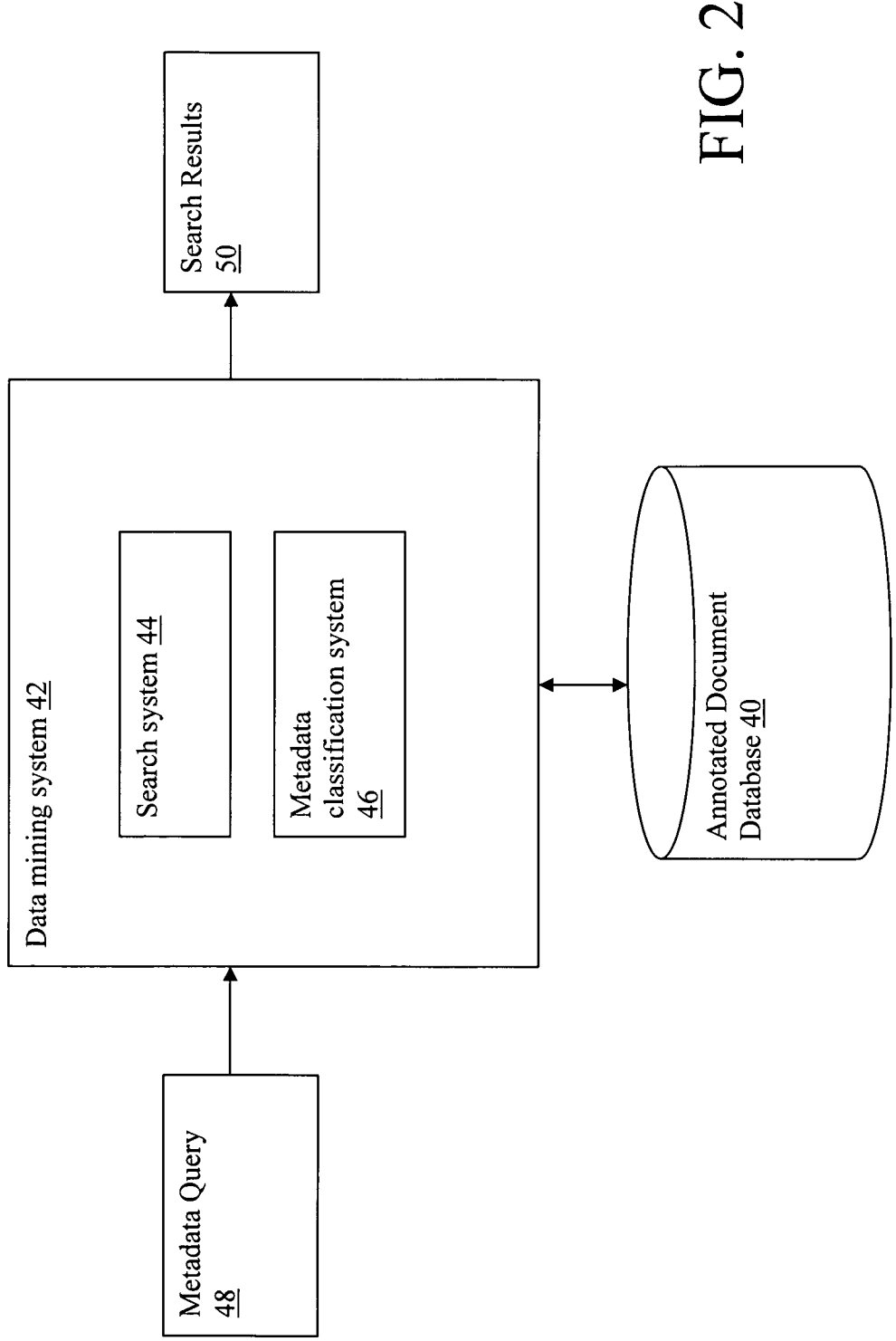

SYSTEM AND METHOD FOR USING TEXT ANALYTICS TO IDENTIFY A SET OF RELATED DOCUMENTS FROM A SOURCE DOCUMENT

BACKGROUND OF THE INVENTION

1. Technical Field

The present invention relates generally to using text analytics to identify a set of documents from a source document, and more specifically relates to a system and method for using text analytics on a technical reference such as a patent, along with a MeSH database, to identify a set of related references.

2. Related Art

Recent years have seen an explosive growth in the field of biotechnology, where discoveries can be worth hundreds of millions of dollars for the entities that own the rights to the discoveries. An ongoing challenge however is the tremendous cost of the research and development that is typically required. Given the dollar figures that are involved, companies must have a full understanding of the technology landscape for a particular biotechnology field.

Much of the technology landscape for a particular field can be gleaned from technical references, such as patent references and other scientific articles. From such references, one can determine the current state of the art, what technology is proprietary, what technology is public domain, etc. One of the challenges however involves quickly and efficiently locating relevant references that relate to a technological endeavor.

In many cases, the researcher may have an initial document, e.g., a patent, a journal article, a patient record, etc., and would like to find a superset of technical references that are related to the initial document. Various methodologies are known for searching for technical references. A common approach involves word searching, in which key words are entered into a database to identify references that include the key words. Other approaches involve utilizing classification data. For instance, in the case of patents, related patents may be identified based on the classification and sub-classification codes that are designated to each patent. In even a further approach, investigators can examine the list of references cited in the initial document.

While each of these techniques is useful, each is limited for obvious reasons. Word searching is limited since different writers often refer to similar concepts using any number of different terms, which generates many useless results. Furthermore, in the case of patents, the number of patents that share the same classification/sub-classification codes can be very large in number, and not always include the relevant features that are being searched. Conversely, the number of cited references listed on a technical document is typically a relatively short list that can only point to preexisting references, which may provide a good starting point, but is almost certainly not comprehensive in nature.

Accordingly, there are currently significant limitations involved in searching and analyzing technical references when trying to understand the technology landscape of a particular field of study.

Fortunately, non-patent literature in the biotechnology field is somewhat more user-friendly. The US National Library of Medicine (NLM) has over the years developed a scientific system called the Universal Medical Language System (UMLS) for the international harmonization of medical information and for the purpose of improving access to medical and scientific literature. The UMLS (http://umls.nlm.nih.gov/) objective is to help researchers intelligently retrieve and integrate information from a wide range of disparate electronic biomedical information sources. It can be used to overcome variations in the way similar concepts are expressed in different sources. This makes it easier for users to link information from patient record systems, bibliographic databases, factual databases, expert systems, etc.

The UMLS knowledge services can also assist in data creation and indexing publications. A part of the UMLS consists of the Medical Subject Heading (MeSH) Codes which serve as the basis for building ontologies important for the classification of the scientific literature. To this end, the NLM has a full time staff who methodically index millions of scientific publications in practically all of the recognized scientific journals. This forms the bases of such national resources such as MedLine (as well as other databases). When the NLM indexers classify and index these journals they do it using the MeSH ontology and in so doing create an extremely valuable set of metadata that describes the articles being indexed. For example, the indexers typically read the articles and make a list of all chemicals that are mentioned in the articles (i.e., the chemical file).

At the highest level, the indexers use a variety of MeSH qualifier codes to determine if the article being indexed is about chemicals, surgery, genetics, etc. At the more granular level, they classify the articles via an extensive system of concept codes, which number more than 750,000. This serves as a rich source of metadata for further classifying and indexing other content.

Unfortunately, there is no automated mechanism that allows a user to find related technical references for an inputted document (e.g., patent document, newspaper article, patient record, etc.) that is not indexed by the NLM or other similar metadata database. Accordingly, a need exists for a system that can identify a superset of technical references for an inputted reference.

SUMMARY OF THE INVENTION

The present invention addresses the above-mentioned problems, as well as others, by providing In a first aspect, the invention provides a document processing system, comprising: a textual analytics system that analyzes unstructured data contained in a source document and extracts a set of structured information about the source document; and a compare system that identifies a set of related documents by comparing the set of structured information with metadata indexed from a set of publications.

In a second aspect, the invention provides a computer program product stored on a computer readable medium for processing a content source, comprising: program code configured for analyzing unstructured data contained in the content source and for extracting a set of structured information about the content source; and program code configured for identifying a set of related documents by comparing the set of structured information with metadata indexed from a set of publications.

In a third aspect, the invention provides a method of processing a source document, comprising: analyzing unstructured data contained in the source document; extracting a set of structured information about the source document; and identifying a set of related documents by comparing the set of structured information with metadata indexed from a set of publications.

In a fourth aspect, the invention provides a method for deploying an application for processing a document, comprising: providing a computer infrastructure being operable to: analyze unstructured data contained in the content source and for extracting a set of structured information about the content source; and identify a set of related documents by comparing the set of structured information with metadata indexed from a set of publications.

In a fifth aspect, the invention provides computer software embodied in a propagated signal for implementing an application for processing a document, the computer software comprising instructions to cause a computer to perform the following functions: analyze unstructured data contained in the source document; extract a set of structured information about the source document; and identify a set of related documents by comparing the set of structured information with metadata indexed from a set of publications.

BRIEF DESCRIPTION OF THE DRAWINGS

These and other features of this invention will be more readily understood from the following detailed description of the various aspects of the invention taken in conjunction with the accompanying drawings in which:

FIG. 2 depicts search engine for searching annotated documents in accordance with an embodiment of the present invention.

DETAILED DESCRIPTION OF THE INVENTION

Figure 1:
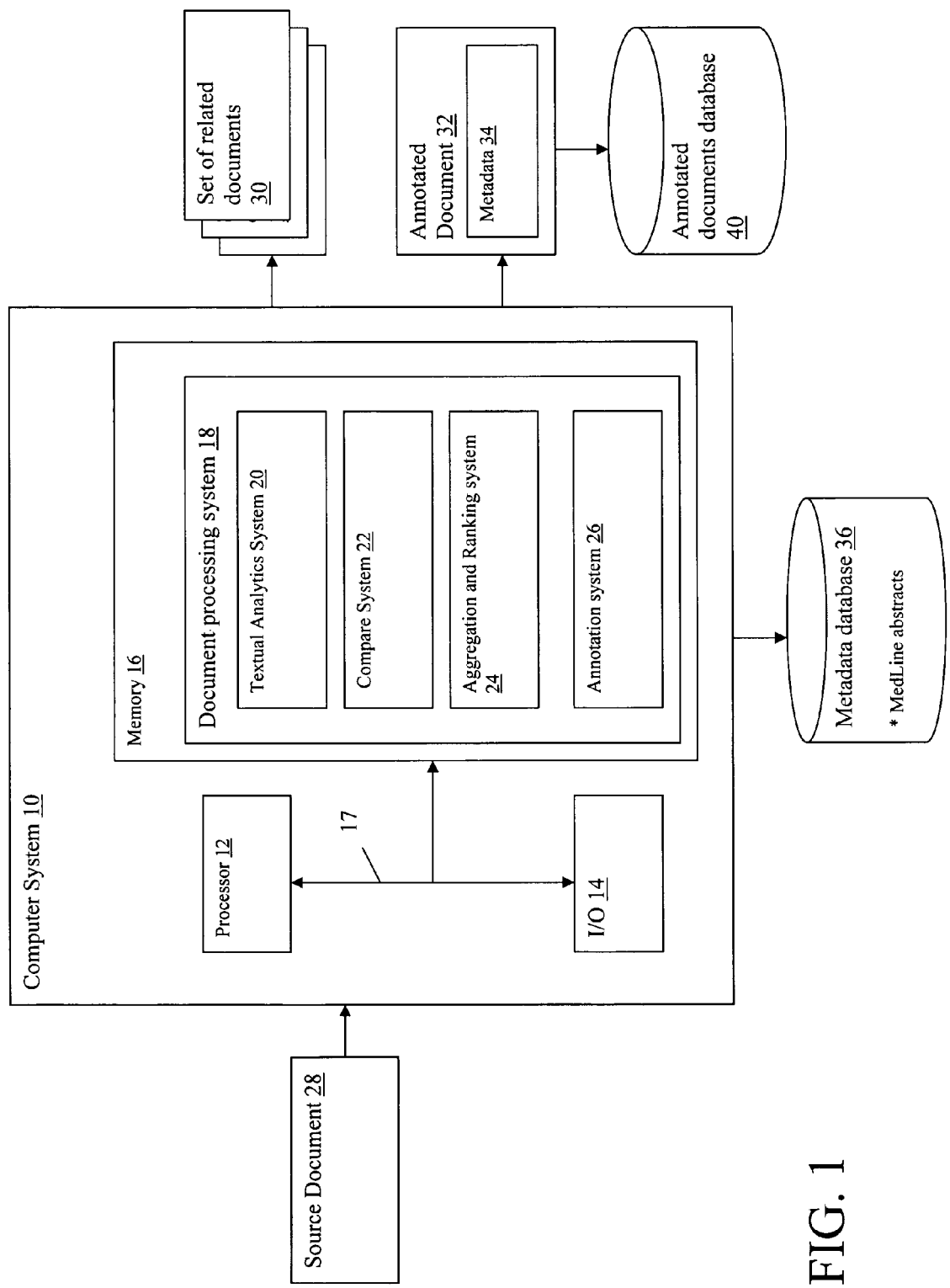
FIG. 1 depicts a computer system having a document processing system in accordance with an embodiment of the present invention.

Referring now to the drawings, FIG. 1 depicts a computer system 10 having a document processing system 18 that analyzes an inputted source document 28 and generates a set of related documents 30. In addition, document processing system 18 may also generate an annotated document 32 that includes metadata 34 used to identify the set of related documents 30. The annotated document 32 may be stored in an annotated documents database 40 (i.e., with other annotated documents). The set of related documents 30 comprises a list of publications that are somehow related or relevant to the inputted source document 28.

It is understood that source document 28 may comprise any type of document, but generally comprises "unstructured information." The generated set of related documents 30 may comprise any documents that can be identified via a metadata database 36. For example, in one illustrative embodiment, source document 28 may comprise a biotechnology related patent document that discloses a particular genetic sequence, and the set of related documents 30 comprises a list of biotechnology references (i.e., journal articles, etc.) that discuss the particular genetic sequence. In another embodiment, source document 28 may comprise a patient record that discloses a particular condition or disease, and the set of related documents 30 may include scientific articles relevant to the condition or disease.

In still a further embodiment, rather than inputting a source document 28, document processing system 18 may input any type of content source that contains unstructured information. Illustrative content sources may include multimedia data such as audio files, video data, images, streaming data, Web pages, etc.

To generate the related set of documents 30, document processing system 18 includes a textual analytics system 20 for extracting "structured information," including key words, such as chemical names, diseases, genes, etc., from the source document 28; a compare system 22 for matching the structured information with metadata stored in metadata database 36 to locate the set of related documents 30; an aggregation and ranking system 24 for aggregating and ranking the set of related documents 30 and/or associated metadata/structured information; and an annotation system for generating an annotated document 32 that includes metadata 34.

Textual analytics system 20 provides a system for analyzing unstructured information in order to generate a set of structured information. Textual analytics system 20 may for instance be implemented with the IBM™ Unstructured Information Management Architecture (UIMA). Structured information may be characterized as information whose intended meaning is unambiguous and explicitly represented in the structure or format of the data. The canonical example of structured information is a relational database table. Unstructured information may be characterized as information whose intended meaning is only loosely implied by its form and therefore requires interpretation in order to approximate and extract its intended meaning. Examples include natural language documents, speech, audio, still images, Web pages and video. It is estimated that 80 percent of all corporate information is unstructured.

In analyzing unstructured content, Unstructured Information Management (UIM) applications make use of a variety of technologies including statistical and rule-based natural language processing (NLP), information retrieval, machine learning, ontologies, and automated reasoning. UIM applications may consult structured sources to help resolve the semantics of the unstructured content. For example, a database of chemical names can help in focusing the analysis of medical abstracts. A UIM application generally produces structured information resources that unambiguously represent content derived from unstructured information input. These structured resources can then be made accessible through a set of application-appropriate access methods. A simple example is a search index and query processor that makes documents quickly accessible by topic and ranks them according to their relevance to key concepts specified by the user. A more complex example is a formal ontology and inference system that, for example, allows the user to explore the concepts, their relationships, and the logical implications contained in a collection consisting of millions of documents.

Textual analytics system 20 may be implemented to identify structured information about a particular technology field (e.g., life sciences) including key words, such as chemical names, diseases, genes, molecules, etc., from the source document 28. Other information, such as a list of chemical abstract (CAS) numbers and a list of SMILES ("simplified molecular input line entry specification," which is a specification for unambiguously describing the structure of chemical molecules using short ASCII alpha-numeric strings) may also be derived by textual analytics system 20 from the source document 28.

Compare system 22 compares the results of textual analytics system 20 with information in metadata database 36 to identify a set of related documents 30. Metadata database 36 comprises metadata indexed from a comprehensive set of technology references, i.e., publications, such as scientific journal articles. In one illustrative embodiment, metadata database 36 comprises a database of MedLine abstracts, which include metadata comprised of MeSH codes, codes, chemical lists, CAS numbers, a SMILES data, etc., for associated publications. Compare system 22 thus identifies publications whose associated metadata matches the structured information obtained by textual analysis system 20. Each such match may result in the identification of a technology reference that can be added to the set of related documents 30. Aggregation and ranking system 24 may be implemented to aggregate results and rank documents within the set of related documents 30.

Annotation system 26 can be utilized to annotate the source document 28 with metadata 34 derived from both the metadata database 36 and from the textual analytics system 20. The metadata 34 in annotated document 32 may likewise be processed/ranked by aggregation and ranking system 24. In an example where source document 28 comprises a patent, an annotated patent could be generated with, e.g., MedLine metadata that includes MeSH data, indexed data associated with technical references containing chemicals in common with the source patent, etc.

In an illustrative embodiment, the metadata database 36 could be loaded as a separate star schema that is part of a larger data warehouse that also contains the annotated documents database 40.

The aggregation and ranking system 24 could be implemented in any manner. For instance, if multiple references within the set of related documents 30 include the same piece of metadata, those instances of the metadata could be aggregated into a single listing with an increased rank of importance. Moreover, aggregation and ranking system 24 could identify "categories" of references and/or metadata that are deemed more important than others. Furthermore, aggregation and ranking system 24 could filter references and/or metadata to exclude certain references or metadata from the results.

Likewise, annotation system 26 may be implemented in any fashion. For instance, the metadata 34 may be stored in additional fields of a document database.

It should be understood that any type of metadata could be used within the context of the present invention to identify a set of related documents 30 and annotate a source document 28. Illustrative types of metadata include MedLine qualifier codes, chemicals, molecular structures, MeSH codes, concept codes, classifications, ontologies, etc. Non-biotechnology related patents, such as software, mechanical, electrical, etc., could likewise be annotated in a similar fashion with domain specific metadata based on, e.g., existing or developed metadata ontologies and classifications.

FIG. 2 depicts a data mining system 42 for exploiting the annotated documents database 40 of FIG. 1. Data mining system 42 includes a search system 44 and metadata classification system 46 that allows a user to enter a metadata query 48 to generate a set of search results 50.

In general, the computer system 10 of FIG. 1 (as well as the data mining system 42 of FIG. 2) may comprise, e.g., a desktop, a laptop, a workstation, etc. Moreover, computer system 10 could be implemented as part of a client and/or a server. Computer system 10 generally includes a processor 12, input/output (I/O) 14, memory 16, and bus 17. The processor 12 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus 17 provides a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

Access to computer system 10 may be provided over a network 36 such as the Internet, a local area network (LAN), a wide area network (WAN), a virtual private network (VPN), etc. Communication could occur via a direct hard-wired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system 10 comprising document processing system could be created, maintained and/or deployed by a service provider that offers the functions described herein for customers. That is, a service provider could offer to provide identifying sets of related documents, a process for annotated documents, and/or a annotated documents database 40 as described above.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part of all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A computer system for processing documents, the system comprising:
   a memory including a document processing system stored thereon, and
   a processor in communication with the memory,
   wherein the processor executes the document processing system stored in the memory, the document processing system including:
   a textual analytics system that analyzes unstructured data contained in a source document to generate a set of structured information about the source document and extracts the set of structured information about the source document;
   a compare system that identifies and aggregates a set of documents related to the source document by comparing the set of structured information with metadata stored in a metadata database, wherein the metadata stored in the metadata database is indexed from a set of technical reference publications,
   wherein a technical reference publication is identified as related to the source document and added to the set of documents related to the source document when the set of structured information extracted from the source document matches an associated metadata of the technical reference publication;
   an annotation system for annotating the source document, wherein the annotation system annotates the source document with the structured information extracted from the source document, and wherein the annotation system further annotates the source document with metadata associated with each technical reference publication in the set of related documents; and
   a ranking system for ranking the metadata in the annotated source document,
   wherein in a case in which more than one technical reference in the set of related documents is associated with a piece of metadata, the piece of metadata is assigned a higher rank of importance relative to a piece of metadata which is associated with fewer technical references in the set of related documents.

2. The computer system for processing documents of claim 1, wherein the set of structured information further comprises key words associated with a technology field.

3. The computer system for processing documents of claim 1, wherein the unstructured data comprises one of natural language documents, speech, audio, still images, and video.

4. The computer system for processing documents of claim 1, further comprising:
   a database of annotated documents; and
   a data mining system for mining the database of annotated documents.

5. A non-transitory computer readable storage medium storing computer instructions, which when executed, enable a computer hardware system to process a content source, the processing comprising:
   analyzing unstructured data contained in the content source to generate a set of structured information about the content source;
   extracting the set of structured information about the content source;
   identifying and aggregating a set of documents related to the content source by comparing the set of structured information with metadata stored in a metadata database, wherein the metadata stored in the metadata database is indexed from a set of technical reference publications,
   wherein a technical reference publication is identified as related to the content source and added to the set of documents related to the content source when the set of structured information extracted from the content source matches an associated metadata of the technical reference publication document;
   annotating the content source with the structured information extracted from the content source and with metadata associated with each technical reference publication in the set of related documents; and
   ranking the metadata in the annotated content source,
   wherein in a case in which more than one technical reference publication in the set of related documents is associated with a piece of metadata, the piece of metadata is assigned a higher rank of importance relative to a piece of metadata which is associated with fewer technical reference publications in the set of related documents.

6. The non-transitory computer readable storage medium of claim 5, wherein the set of structured information further comprises key words associated with a technology field.

7. The non-transitory computer readable storage medium of claim 5, wherein the unstructured data comprises one of: natural language documents, speech, audio, still images, and video.

8. The non-transitory computer readable storage medium of claim 5, the processing further comprising:
   storing an annotated content source in a database of annotated documents; and
   data mining the database of annotated content sources.

9. A method of processing a source document on a computer system, comprising:
   analyzing unstructured data contained in the source document using a processor;
   generating a set of structured information about the source document, and storing the set of structured information in a memory;
   extracting the set of structured information about the source document;
   identifying and aggregating a set of documents related to the source document by comparing the set of structured information with metadata stored in a metadata database, wherein the metadata stored in the metadata database is indexed from a set of technical reference publications,
   wherein a technical reference publication is identified as related to the source document and added to the set of documents related to the source document when the set of structured information extracted from the source document matches an associated metadata of the technical reference publication, wherein the set of structured information comprises a list of chemical abstract numbers;
   annotating the source document with the structured information extracted from the source document, and with metadata associated with each technical reference publication in the set of related documents; and
   ranking the metadata in the annotated source document,
   wherein in a case in which more than one technical reference publication in the set of related documents is associated with a piece of metadata, the piece of metadata is assigned a higher rank of importance relative to a piece of metadata which is associated with fewer technical reference publications in the set of related documents.

10. A method for deploying an application for processing a document on a computer system, comprising:
   providing a computer infrastructure being operable to:
   analyze unstructured data contained in the content source using a processor to generate a set of structured information about the content source,
   extract the set of structured information about the content source and store the set of structured information in a memory;
   identify and aggregate a set of documents related to the content source by comparing the set of structured information with metadata stored in a metadata database, wherein the metadata stored in the metadata database is indexed from a set of technical reference publications,
   wherein a technical reference publication is identified as related to the content source and added to the set of documents related to the content source when the set of structured information extracted from the source document matches an associated metadata of the technical reference publication,
   annotate the source document with metadata associated with the structured information extracted from the source document, and with metadata associated with each technical reference publication in the set of related documents; and
   rank the metadata in the annotated source document,
   wherein in a case in which more than one technical reference publication in the set of related documents is associated with a piece of metadata, the piece of metadata is assigned a higher rank of importance relative to a piece of metadata which is associated with fewer technical reference publications in the set of related documents.

* * * * *